United States Patent
Houtepen et al.

(10) Patent No.: US 7,480,296 B2
(45) Date of Patent: Jan. 20, 2009

(54) METHOD AND DEVICE FOR GENERATING A MULTIPLEXED MPEG SIGNAL

(75) Inventors: Robert Cornelis Houtepen, Eindhoven (NL); Emmanuel David Lucas Michael Frimout, Eindhoven (NL); Lincoln Sampaio Lobo, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1560 days.

(21) Appl. No.: 09/906,603

(22) Filed: Jul. 17, 2001

(65) Prior Publication Data

US 2002/0012361 A1   Jan. 31, 2002

(30) Foreign Application Priority Data

Jul. 19, 2000   (EP)   ................... 00202590

(51) Int. Cl.
*H04L 12/28*   (2006.01)
*H04J 3/24*   (2006.01)
*H04J 3/04*   (2006.01)

(52) U.S. Cl. .................. 370/392; 370/474; 370/535

(58) Field of Classification Search .......... 370/392, 370/401, 400, 532–542, 470–477
See application file for complete search history.

(56) References Cited

U.S. PATENT DOCUMENTS

| | | | | |
|---|---|---|---|---|
| 5,550,593 A | * | 8/1996 | Nakabayashi | 348/465 |
| 5,802,068 A | * | 9/1998 | Kudo | 370/538 |
| 6,594,439 B2 | * | 7/2003 | Imahashi et al. | 386/52 |
| 6,782,553 B1 | * | 8/2004 | Ogawa et al. | 725/146 |
| 6,792,006 B1 | * | 9/2004 | Kumaki et al. | 370/537 |
| 6,870,861 B1 | * | 3/2005 | Negishi et al. | 370/537 |
| 6,885,680 B1 | * | 4/2005 | Kovacevic et al. | 370/503 |
| 6,912,218 B1 | * | 6/2005 | Jeon | 370/392 |

FOREIGN PATENT DOCUMENTS

EP   0901283 A1   10/1999

\* cited by examiner

*Primary Examiner*—Andrew Lee
(74) *Attorney, Agent, or Firm*—Michael E. Belk

(57) ABSTRACT

A method and a device are described for generating a program stream of MPEG coded video and audio signal, wherein several functional tasks are distributed in an optimal manner between hardware on the one hand and software on the other hand. Forming the elementary streams is performed in hardware. Packer and packetiser functions are performed in hardware by pre-packing the elementary streams, filling-in packet header and pack header as much as possible. Parsing of the elementary streams is performed in hardware. Parse information is stored in a meta byte structure in each prepack. Maintaining the P-STD Model is performed in software. Deciding for an audio pack or a video pack is performed in software. Finishing the packet header and pack header is performed in software, on the basis of the parse information present in the meta byte structure in each prepack.

26 Claims, 8 Drawing Sheets

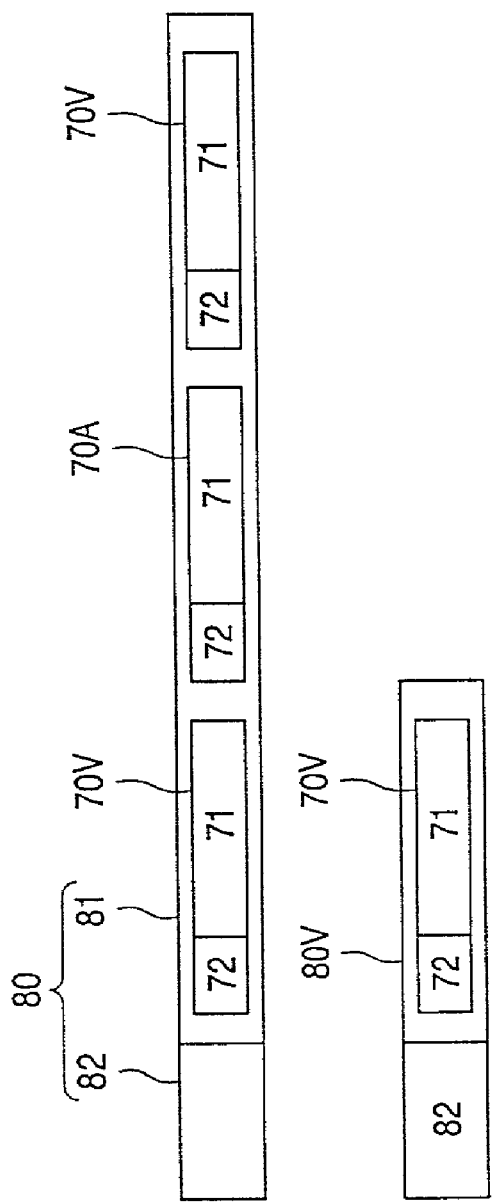

METHOD AND DEVICE FOR GENERATING A MULTIPLEXED MPEG SIGNAL

Figure 1:
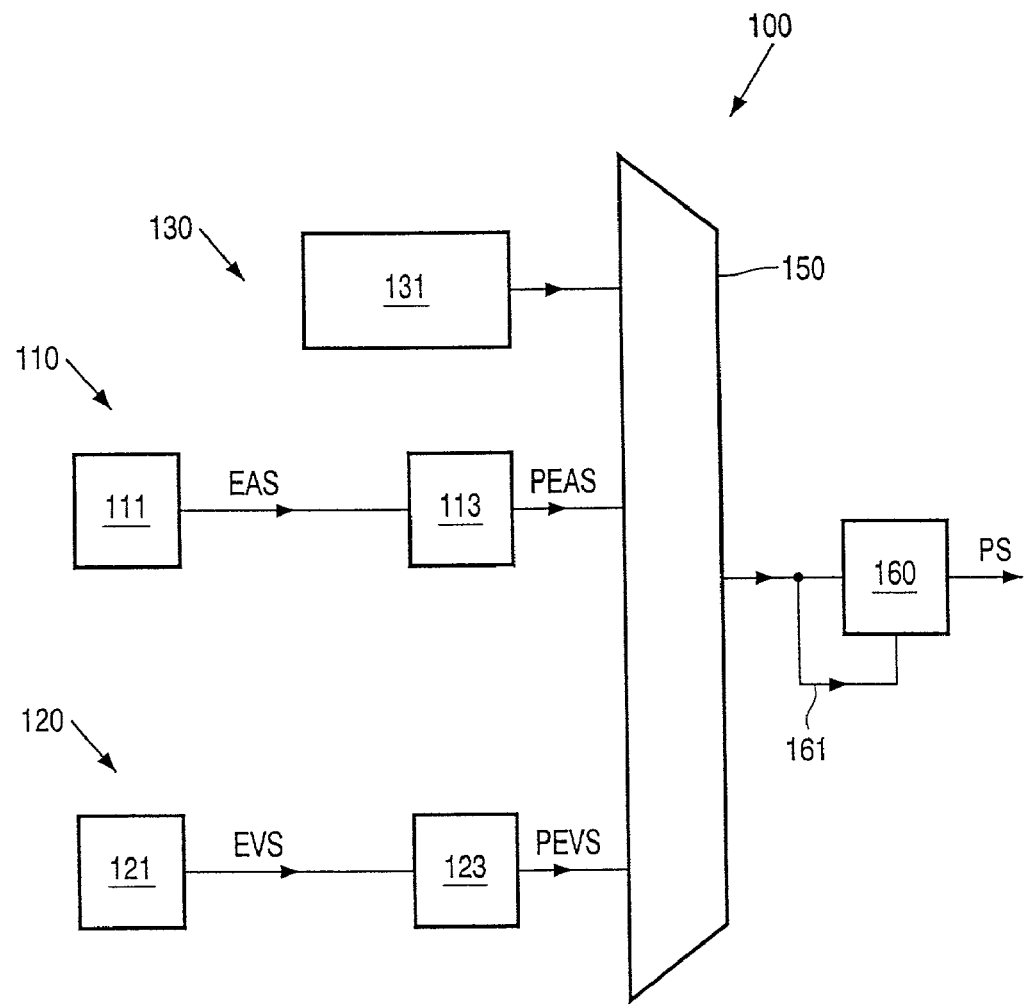

The present invention relates in general to the art of generating a multiplexed MPEG signal.

In general, there is a need for cost effective apparatus for the consumer market, able to record a digital audio/video signal. Such an apparatus will receive an audio/video signal from an arbitrary source, process the input signal, and produce an MPEG program stream suitable for storage on a medium such as a hard disk, optical disk, etc.

The MPEG program stream comprises packs, each pack comprising a pack header and a pack data portion containing packets, each packet comprising a packet header and a packet data portion. The data is, normally, either audio data or video data, hence the packets will be referred to as audio packets or video packets. The headers contain information necessary for decoding, for instance an indication whether the packet is a video packet or an audio packet; the information in the headers is structured in fields.

Since the encoding process for audio packets differs from the encoding process for video packets, encoding of the audio signal on the one hand and encoding of the video signal on the other hand is done by two different encoders, the audio encoder and the video encoder, respectively. Similarly, packetising the encoded audio signal on the one hand and packetising the encoded video signal on the other hand is done by two different packetisers, the audio packetiser and the video packetiser, respectively. Hence, the audio signal and the video signal are processed in separate audio and video channels, respectively, each resulting in a stream of audio packets and a stream of video packets, respectively. A multiplexer receives the two streams of audio packets and the video packets, and produces a single stream of packets, audio and video packets mixed. A packer combines a certain number of subsequent packets and places them in a pack. The output stream of packs is the program stream.

Since such apparatus are known in practice, a detailed description of the relevant components will be omitted.

A problem in this respect is that part of the fields in the pack headers and in the packet headers can only be filled-in when the program stream is finished, in other words: by the packer. For this reason, the packets as produced by the audio packetiser and the video packetiser, respectively, are not final; therefore, to distinguish them from the final packets in the program stream, they are referred to as "preliminary packets" or "prepackets". The information that is to be filled-in by the packer to finish the headers will be indicated hereinafter as "finishing data".

At least part of the finishing data is to be derived from the elementary streams. This part of the finishing data will be indicated hereinafter as "elementary stream derivable finishing data", abbreviated as "ESDF data". Conventionally, the packer is designed to analyze the incoming prepackets and to thus obtain the required ESDF data. If such is implemented in hardware, relatively complicated and therefore expensive ICs are necessary. If, however, such is implemented in software, a very powerful processor is necessary for providing the necessary computing power.

The present invention is based on the insight that said ESDF data is fully known at the stage of the audio packetiser and the video packetiser, respectively. Based on this insight, the present invention proposes a different approach. At the time the prepackets are generated, additional information is generated, and this additional information is appended after each prepacket. The additional information bytes will be indicated hereinafter as "meta bytes". These meta bytes will contain the said ESDF data, or at least data from which said ESDF data can easily be deducted. The meta bytes may also contain information that is used to support trick modes.

Thus, parsing of the incoming audio and video elementary streams, producing the prepackets, and producing the meta bytes appended after each prepacket can advantageously be implemented in hardware, while preparing the final packets and multiplexing and packing them into the program stream can advantageously be implemented in software. The packing software needs only to process the meta bytes, and does not need to parse the incoming streams.

Figure 2:
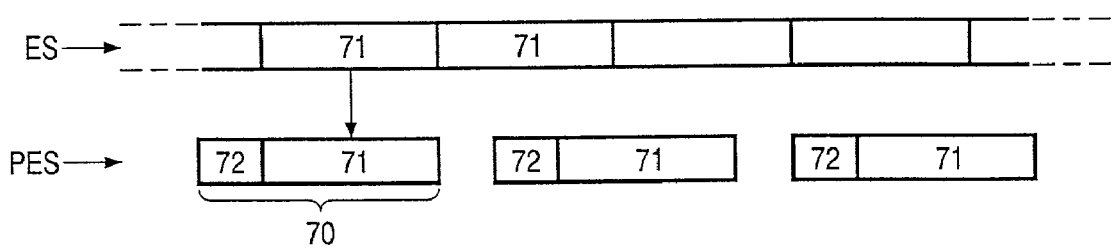
Figure 4A:
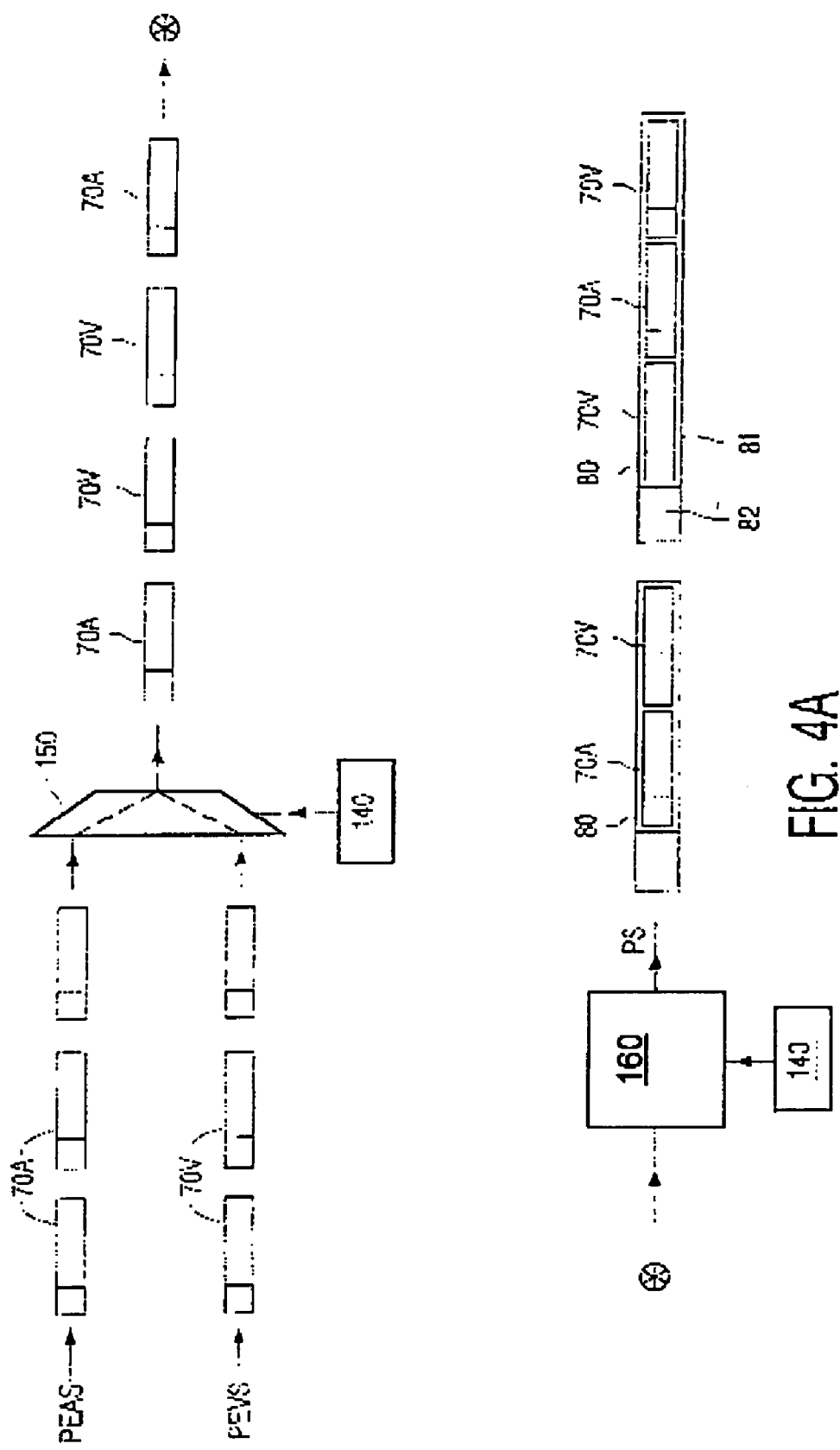
Figure 4B:
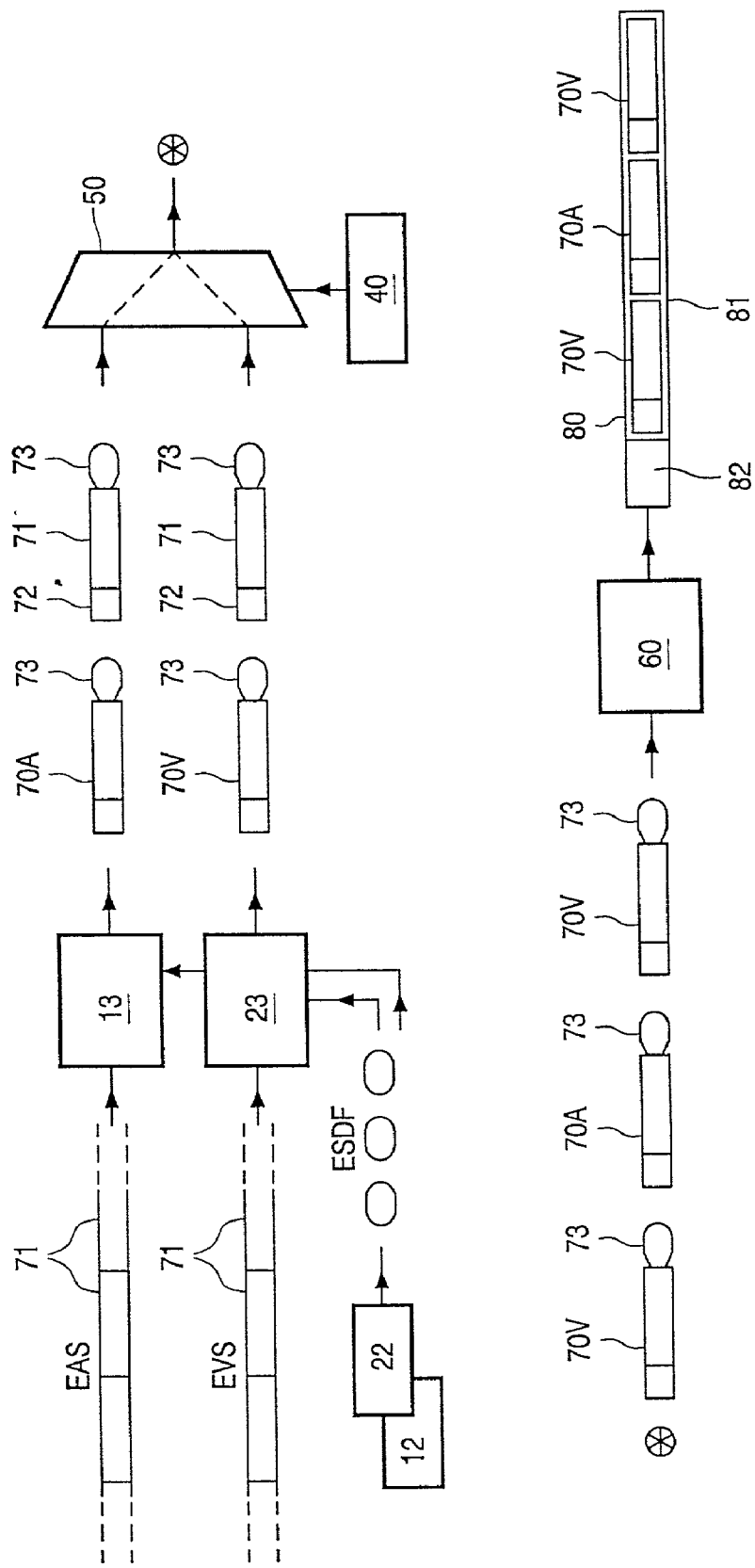
Figure 4C:
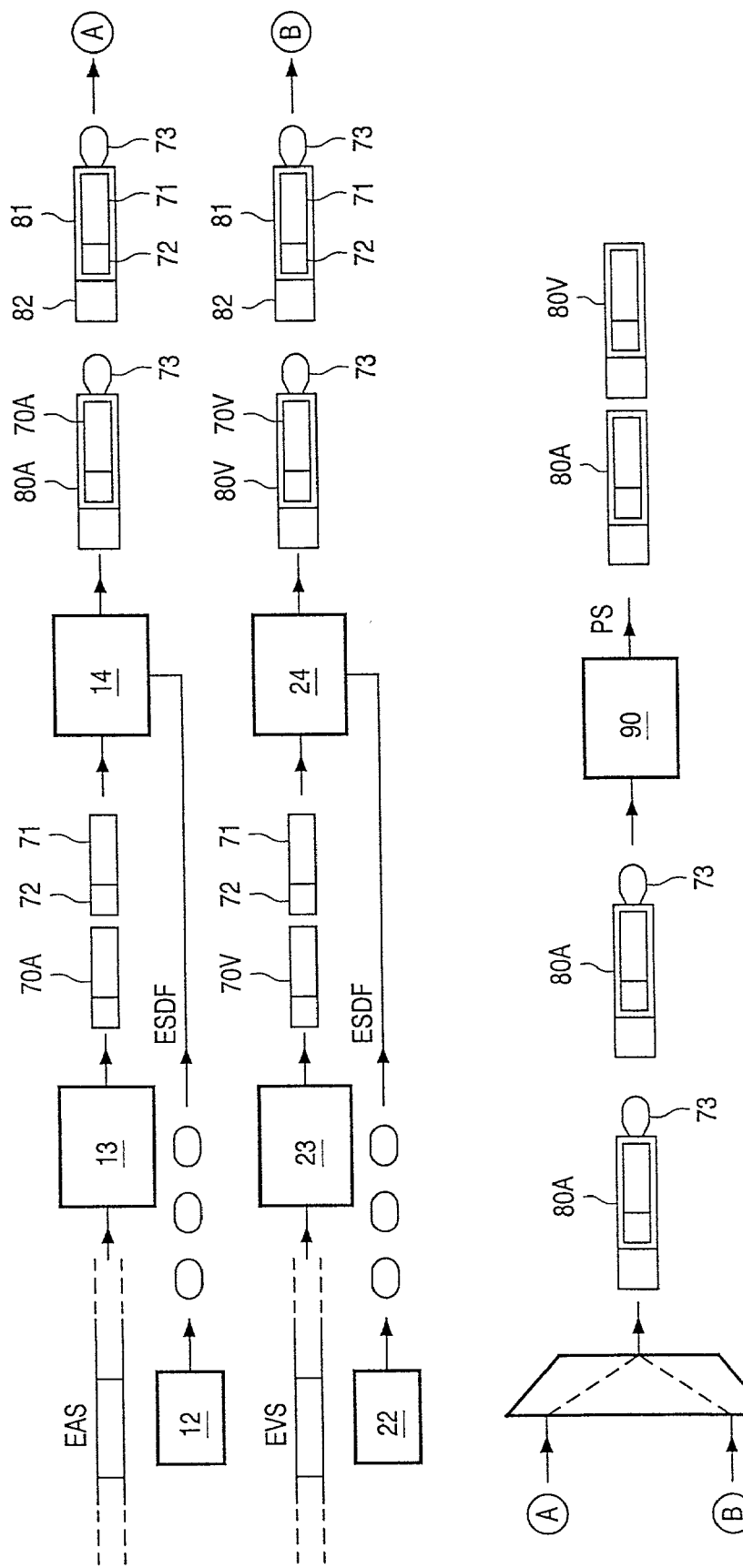
Figure 5:
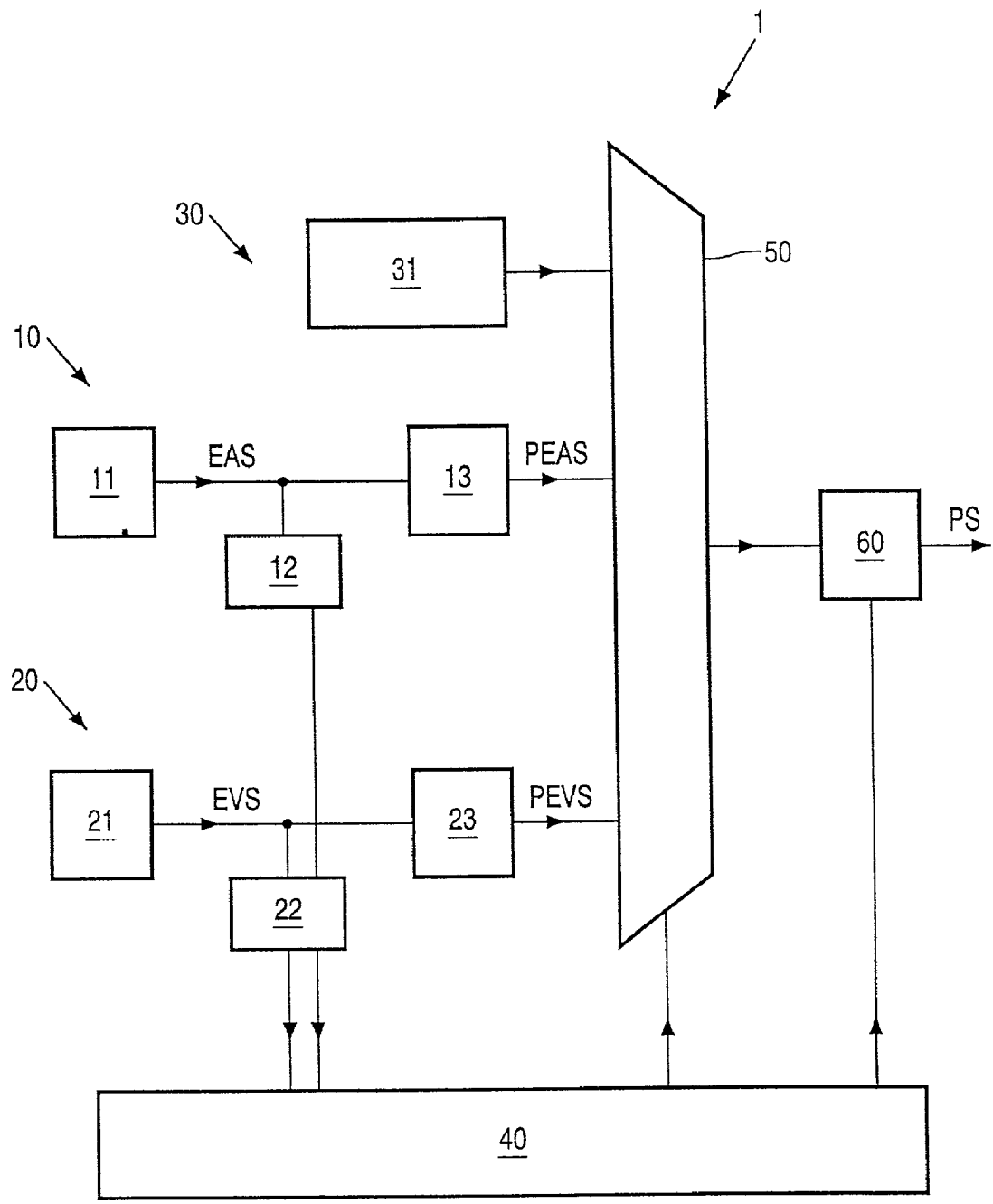
Figure 6A:
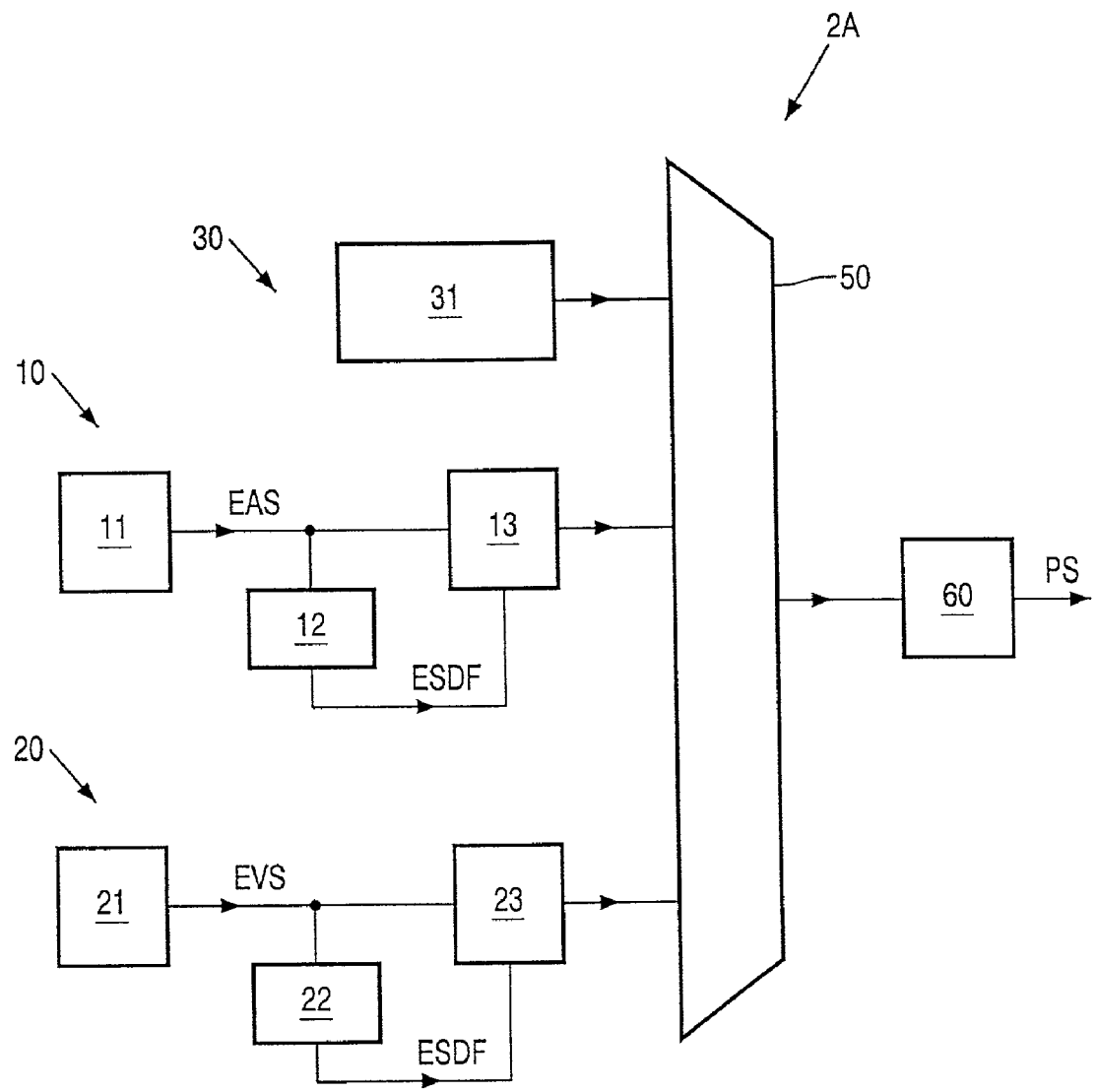
Figure 6B:
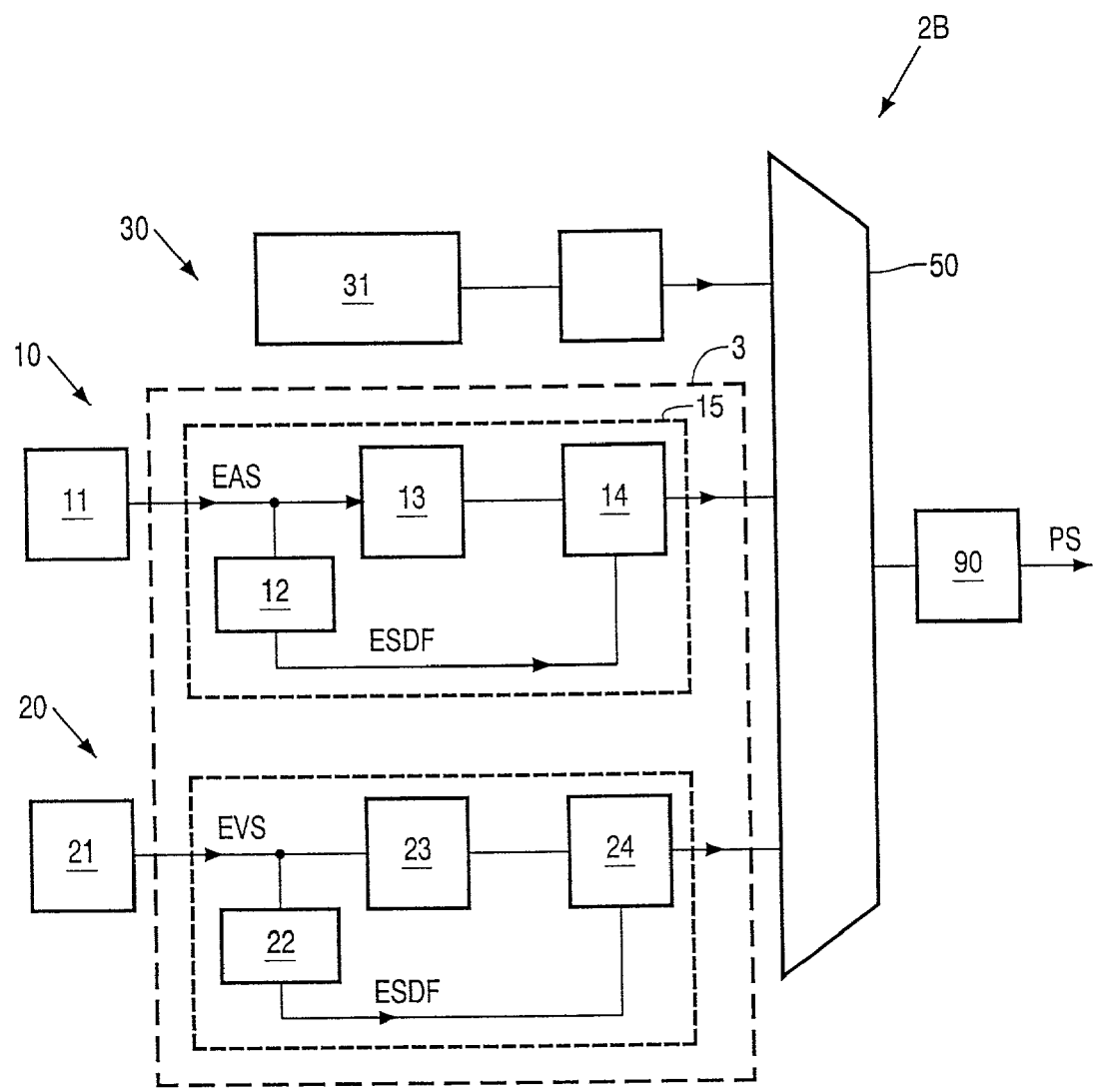

These and other aspects, characteristics and advantages of the present invention will be further clarified by the following description of an apparatus and process in accordance with the invention, with reference to the drawings, in which same reference numerals indicate equal or similar elements, and in which:

FIG. 1 is a block diagram which schematically illustrates a process for generating a program stream in accordance with the state of the art;

FIG. 2 schematically illustrates a process for packetising an elementary stream;

FIGS. 3A-C schematically illustrate a pack;

FIGS. 4A-C schematically illustrate processes for forming packs;

FIG. 5 is a block diagram comparable to FIG. 1, which schematically illustrates an embodiment of a process for generating a program stream in accordance with the invention;

FIGS. 6A-B are block diagrams comparable to FIG. 5, which schematically illustrate preferred embodiments of the invention.

FIG. 1 is a schematical functional block diagram of a conventional apparatus 100 for generating a program stream. The apparatus 100 comprises an audio channel 110 and a video channel 120. An audio signal is encoded and compressed, in accordance with the MPEG standard, by an audio encoder 111; the output of the audio encoder 111 is referred to as elementary stream ES, in this case elementary audio stream EAS. Likewise, a video signal is encoded and compressed, in accordance with the MPEG standard, by a video encoder 121; the output of the video encoder 121 is also referred to as elementary stream ES, in this case elementary video stream EVS. In FIG. 2, an elementary stream ES is shown as a continuous stream of digital information.

Each elementary stream is subdivided into data portions, indicated in FIG. 2 at 71. Each data portion 71 is provided with a packet header, indicated in FIG. 2 at 72. The combination of packet data portion 71 and packet header 72 is referred to as a packet 70.

The operation of creating audio packets 70A from the elementary audio stream EAS is called "packetising", and is performed by a functional block 113 referred to as "audio packetiser". Likewise, a video packetiser 123 creates video packets 70V from the elementary video stream EVS. The packetisers 113, 123 not only form the packets 70A, 70V, but also fill-in the data fields of the packet headers as much as possible. However, part of the data to be filled-in is not yet available. Therefore, although in the data stream space is reserved for all data fields of the packet header 72, some of these data fields are not yet completely filled-in; these data fields will be referred to as "open data fields". Because the packets are not finished, in the sense that some data fields are left open, they are, at this stage, referred to as preliminary packet or prepacket 70, more specifically a preliminary audio packet or a preliminary video packet.

The stream of packetised information outputted by the packetisers 113, 123 is referred to as packetised elementary stream PES. Thus, the audio packetiser 113 will output a packetised elementary audio stream PEAS, and the video packetiser 123 will output a packetised elementary video stream PEVS.

In FIG. 1 is shown that the apparatus may comprise an auxiliary channel 130 in which auxiliary information is processed by a block 131, creating a stream of packetised auxiliary information, which may be combined with the packetised elementary audio stream and the packetised elementary video stream. However, this auxiliary information will hereinafter be neglected for the sake of convenience.

Thus, the video information and the audio information are "produced" in two separate streams, in packetised form. These two streams are to be combined into one single stream, comprising video packets as well as audio packets. The operation of placing video packets and audio packets behind each other in a suitable order is performed by a functional block called "multiplexer", indicated at 150 in FIGS. 1 and 4A. As indicated in FIG. 4A, the multiplexer 150 performs this operation under the control of a control unit 140. Particularly, the control unit 140 decides whether a video prepacket or an audio prepacket is to be outputted. For sake of simplicity, the multiplexer may be regarded as a controllable switch, passing either an audio prepacket or a video prepacket; more specifically, the multiplexer 150 comprises a memory structure in which the video prepackets and the audio prepackets as received are stored, and from which prepackets are retrieved for outputting, wherein the control unit 140 decides whether an audio prepacket or a video prepacket is to be retrieved and outputted.

The outputted stream of audio and video prepackets does not yet constitute a program stream, because on the one hand the prepackets are still to be finished by filling-in the finishing data in the open packet header data fields, while further, in accordance with the MPEG standard, the information in a program stream PS should be provided in the shape of packs 80, each pack 80 comprising a pack header 82 followed by a pack data portion 81, wherein each pack data portion 81 comprises at least one packet 70. In accordance with the MPEG standard, each pack 80 may comprise a plurality of packets 70, which may be of mutually different type. Thus, FIG. 3A illustrates a pack 80 comprising a video packet 70V followed by an audio packet 70A followed by again a video packet 70V.

The operation of grouping packets and producing packs is performed by a functional block called "packer" and indicated at 160 in FIGS. 1 and 4A. In fact, the packer 160 fulfills three tasks, also under control of the control unit 140. On the one hand, the packer 160 groups a number of subsequent video prepackets and audio prepackets into a pack 80. Further, the packer 160 finishes the packet headers 72 of the prepackets 70 by filling-in the finishing data in the open packet header data fields, thus producing packets. Also, the packer 160 fills-in the pack header data fields.

At least part of the finishing data needed for finishing the packet headers 72 and the pack headers 82 is normally to be derived from the elementary stream (ESDF data). A problem in this respect is that the elementary stream is MPEG-coded. Conventionally, the stream of audio and video prepackets is to be decoded (parsing) by the packer 160 to obtain such ESDF data. This is indicated at 161 in FIG. 1. According to the invention, it is not necessary anymore to burden the packer 160 with the task of parsing in order to obtain the necessary ESDF data. Instead, the necessary ESDF data is derived from the elementary stream by a parser, advantageously implemented in hardware. This parser communicates said ESDF data to the finishing stage of the process.

FIG. 5 is a schematical functional block diagram of an apparatus 1 for generating a program stream in accordance with the invention. Components that are comparable to components of the conventional apparatus 100 are indicated with the same reference numerals, yet decreased by 100. As shown in FIG. 5, the audio channel 10 comprises an audio parser 12 that receives the elementary audio stream EAS, and is designed to parse the elementary audio stream EAS and derive therefrom the data necessary for inclusion in the packet headers 72 and the pack headers 82, especially said ESDF data. Similarly, the video channel 20 comprises a video parser 22.

In principle, the parsers 12, 22 may communicate said data through any suitable method of communication. In FIG. 5 is indicated that the parsers 12, 22 communicate with the master control unit 40, and that the packer 60 also communicates with this master control unit 40; therefore, it is possible to communicate said information through said master control unit 40. However, it is then necessary to ensure that said information is processed by the packer 60 in respect of the correct packet.

The invention also eliminates this problem by directly coupling each packet and the ESDF data corresponding therewith. Stated briefly, said ESDF data is included in the packetised elementary data stream in the form of meta bytes 73 associated with a packet 70. This will be explained hereinafter with reference to the embodiment of FIGS. 6A-B and FIGS. 4B-C.

FIG. 6A illustrates an embodiment of an apparatus 2A in accordance with the invention. As indicated in FIG. 6A, the parsers 12, 22 provide the parse data, especially the ESDF data, directly to the packetisers 13, 23. As described above, the packetisers 13, 23 create prepackets 70A, 70V, and fill-in the fields in the packet headers 72 as much as possible, leaving some open data fields. According to an important aspect of the present invention, the ESDF data is received from the parsers 12, 22 by the packetisers 13, 23, and appended after the prepackets 70A, 70V in the form of meta bytes 73, as illustrated in FIG. 4B.

The multiplexer 50 receives the streams of audio prepackets 70A and video prepackets 70V, including the meta bytes 73, and puts the audio prepackets 70A and video prepackets 70V, including the meta bytes 73, in a suitable order, under the control of the control unit 40, similarly as described above. Thus, similarly as described above, the multiplexer produces a single stream of audio prepackets 70A and video prepackets 70V, including the meta bytes 73, which stream is received by the packer 60. The packer 60 performs the operations of grouping a number of subsequent video prepackets and audio prepackets into packs, finishing the packet headers, and filling-in the pack header data fields, similarly as described above. However, instead of the packer needing to parse the prepackets, the packer 60 according to the present invention is designed to remove the meta bytes 73 from the data stream, to read the ESDF data in the meta bytes 73, to finish the packet headers 72 of the prepackets 70 by filling-in the finishing data in the open packet header data fields, thus producing packets, and also to fill-in the required data in the pack header data fields.

As stated above, in accordance with the MPEG standard, each pack 80 may comprise a plurality of packets 70, which may be of mutually different type. However, according to the DVD standard, packs may only comprise one packet, possibly supplemented by padding packets or stuffing bytes in view of the fact that the packets may have varying lengths whereas the packs have fixed lengths. The apparatus according to the present invention is preferably in conformity with the DVD standard; therefore, as shown in FIG. 3B, a pack 80 comprises one packet 70 only. A pack that comprises a video packet 70V will be referred to as video pack 80V, and a pack that comprises an audio packet 70A will be referred to as audio pack 80A. In such a case, the function of creating packs from the prepackets can again be performed by a packer 60 after the function of multiplexing, as shown in FIG. 6A, but preferably the function of creating packs from the prepackets is performed before the function of multiplexing the audio and video, as shown in FIGS. 6B and 4C regarding a preferred embodiment of apparatus 2B.

In such a case, the packetiser 13, 23 creates prepackets 70A, 70V, and fills-in the fields in the packet header 72 as much as possible, as described above. From the packetiser 13, 23, the prepackets 70A, 70V are received by a prepacker 14, 24, respectively. The prepacker 14, 24 creates a pack 80A, 80V, comprising the pack header 82 and the pack data portion 81, containing the prepackets 70. Similarly as described above with respect to the packetiser 13, 23, the prepacker 14, 24 fills-in the fields in the pack header 82 as much as possible, but the prepacker 14, 24 can not fill-in the data fields of the pack headers completely, leaving some open data fields. Therefore, the packs outputted by the prepacker 14, 24 will be referred to as prepacks. The information that is to be filled-in in the open data fields to finish the pack headers will also be indicated as finishing data.

As indicated in FIG. 6B, the ESDF data is received from the parsers 12, 22 by the prepackers 14, 24, and appended after the prepacks 80 in the form of meta bytes 73, as illustrated in FIG. 4C.

The multiplexer 50 receives the streams of audio prepacks 80A and video prepacks 80V, including the meta bytes 73, and puts the audio prepacks and video prepacks, including the meta bytes 73, in a suitable order, under the control of the control unit 40, similarly as described above. This single stream is received by a functional block which is referred to as finisher 90. The finisher removes the meta bytes 73 from the data stream, and reads the ESDF data in the meta bytes 73. The finisher 90 is designed to finish the packet headers 72 of the prepackets 70 by filling-in the finishing data in the open packet header data fields, thus producing packets. Further, the finisher 90 is designed to finish the pack headers 82 of the prepacks 80 by filling-in the finishing data in the open pack header data fields, thus producing packs.

It is to be noted that, instead of using a separate packetiser 13, 23 and a separate prepacker 14, 24, a combined packetiser/prepacker unit may be used. Such unit will create a prepack, comprising the pack header 82, the packet header 72, and the packet data 71, will also fill-in the fields in the pack header 82 and the fields in the packet header 72 as much as possible, will receive the ESDF data from the parser 12, 22, and will append the ESDF data as meta bytes 73 to the prepacks 80. For easy description, however, operations to be performed at the level of packets will be attributed to a packetiser, and operations to be performed at the level of packs will be attributed to a prepacker.

Further, also the parser 12, 22 may be combined with the packer or with the combined packetiser/prepacker unit to form an integrated parser/packetiser/prepacker unit 15, 25. Still further, the two parsers 12, 22, the two packetisers 13, 23, and the two prepackers 14, 24 are preferably provided as one single integrated unit (chip), referred to as common meta unit 3.

Even the encoders 11, 21 may form part of such integrated unit. However, it is preferred to implement the encoder 11, 21 as separate component, in view of the fact that these components are standard available components.

An important aspect of the present invention is that it is possible to implement the functions of encoder, parser, packetiser, prepacker in hardware, either as separate units or as combined unit, and that it is possible to implement the multiplex function and the finishing functions in software. At the level of the multiplex function, it is first decided whether an audio pack or a video pack (or an auxiliary pack) is to be outputted in the program stream. After that, the corresponding packet header and the corresponding pack header are finished by filling-in the fields that were left open by the packetiser and the prepacker, respectively. The finisher 90 (or the packer 60) finds the necessary ESDF data in the meta bytes 73.

In principle, the length of the packs is not critical. However, for compatibility with DVD, the length of the packs is preferably equal to 2048 bytes. This length is the same as the data area in a CD-ROM sector or a DVD sector. In a practical implementation, the overall length of the prepacks is 2048 bytes, of which 24 bytes are reserved for the pack header, 24 bytes are reserved for the packet header, 2000 bytes are reserved for the packet data.

For the meta bytes, 16 bytes may be appended to the prepackets or the prepacks.

In the case of a video pack, the information contained in the video meta bytes can be as follows:
Flags: GOP start, GGOP start, SEQ End, Padding needed, Video signal present
Data Length
Time Stamp
Picture Start Count
Picture Type and Position of first and second position
GOP Header position In the case of an audio pack, the information contained in the audio meta bytes can be as follows:
Flags: Framing Error, Stop, Sync, Padding needed,
Audio type
Data Length
Time Stamp
Frame Start Count
First and last frame position It will be clear to a person skilled in the art that the present invention already provides an advantage if any one of the above-mentioned information is contained in meta bytes, although preferably all of the above-mentioned information is contained in meta bytes.

Further, as will be clear to a person skilled in the art, the ESDF data will be contained in the meta bytes according to a predefined format, known to both the parser hardware and the packer software or finisher software, which format may be any suitable format and will not be discussed here.

Thus, the present invention succeeds in providing a method and a device for generating a program stream of MPEG coded video and audio signal, wherein several functional tasks are distributed in an optimal manner between hardware on the one hand and software on the other hand. Forming the elementary streams is performed in hardware. Prepacker and packetiser functions are performed in hardware by pre-packing the elementary streams, filling-in packet header and pack header as much as possible. Parsing of the elementary streams is performed in hardware. Parse information is stored in a meta byte structure with each prepack. Maintaining the P-STD Model (MPEG) is performed in software. Deciding for an audio pack or a video pack is performed in software. Finishing the packet header and pack header is performed in software, on the basis of the parse information present in the meta byte structure with each prepack.

The invention is embodied in a hardware device which comprises the encoders 11, 21, the parsers 12, 22, the packetisers 13, 23, and possibly the prepackers 14, 24, and which has outputs for providing the streams of audio prepackets and video prepackets or the streams of audio prepacks and video prepacks as output signals.

The invention is further embodied in a hardware device 3, possibly a component such as a chip, which comprises the parsers 12, 22, the packetisers 13, 23, and possibly the prepackers 14, 24, which has inputs for receiving the elementary audio and video streams, and which has outputs for providing the streams of audio prepackets and video prepackets or the streams of audio prepacks and video prepacks as output signals.

The invention is further embodied in a software component (suitably programmed processor) which performs the functions of the multiplexer 50 and the packer 60 or the functions of the multiplexer 50 and the finisher 90, respectively. The invention is further embodied in software which, when running on a processor, performs the functions of the multiplexer 50 and the packer 60 or the functions of the multiplexer 50 and the finisher 90, respectively.

The invention is further embodied in a coder apparatus 2A comprising the encoders 11, 21, the parsers 12, 22, the packetisers 13, 23, the multiplexer 50, and the packer 60. The invention is further embodied in a coder apparatus 2B comprising the encoders 11, 21, the parsers 12, 22, the packetisers 13, 23, the prepackers 14, 24, the multiplexer 50, and the finisher 90. Such coder apparatus 2A, 2B can be used as a component in a digital display apparatus (TV set) or digital recording apparatus (DVD, hard disk, etc) for allowing such apparatus to process normal audio and video signals. Such coder apparatus can also be used as a component in a playback device for playing normal audio and video recordings and outputting digital audio and video signals.

It should be clear to a person skilled in the art that the scope of the present invention is not limited to the examples discussed in the above, but that several amendments and modifications are possible without departing from the scope of the invention as defined in the appending claims.

For instance, the invention is not restricted to the coding of audio and video signals in accordance with the MPEG format.

Further, the multiplexer and the packer, which are described above as separate modules, can be implemented as an integrated module, advantageously a software module. The same applies for the multiplexer and the finisher.

The invention claimed is:

1. Method for generating a multiplexed signal (PS), comprising the following steps:
   a1) digitizing and coding an audio signal to provide an elementary audio stream (EAS);
   a2) digitizing and coding a video signal to provide an elementary video stream (EVS);
   b1) dividing the elementary audio stream (EAS) into prepackets (70A) comprising a header (72) and a data portion (71);
   b2) dividing the elementary video stream (EVS) into prepackets (70V) comprising a header (72) and a packet data portion (71);
   c) merging said packetised elementary streams into one single stream;
   d) finishing the prepackets (70A; 70V) such as to form packets (70A; 70V) by filling-in ESDF data in at least one data field of the header (72) of each prepacket (70A; 70V);

wherein said ESDF data is derived from the elementary streams (EAS; EVS) before the packetising step (b1; b2), and is communicated to the finishing step (d).

2. Method according to claim 1, wherein the program stream (PS) comprises packs (80), each pack comprising a pack header (82) and a pack data portion (81) containing a predetermined number of packets (70A; 70V), and wherein at least one data field of the pack headers (82) is filled-in with part of said ESDF data after said merging step (c).

3. The method of claim 1, wherein said ESDF data is communicated to said finishing step by incorporating said ESDF data in the packetised elementary streams, said ESDF data being removed from the data stream at the finishing step.

4. The method of claim 3, wherein said ESDF data is appended to the audio and video prepackets as meta bytes.

5. The method of claim 3, wherein:
   the packs comprise only packets of one type;
   audio and video prepacks are formed from the audio and video prepackets before said merging step;
   said ESDF data is appended to the audio and video prepacks as meta bytes;
   the streams of audio and video prepacks are merged into one single stream of prepacks;
   said ESDF data is retrieved from the meta bytes associated with the prepacks;
   the prepacks are finished such as to form packs by filling-in ESDF data in at least one data field of the header of each prepack;
   the prepackets are finished such as to form packets by filling-in ESDF data in at least one data field of the header of each prepacket; and
   the meta bytes are removed from the data stream.

6. The method of claim 1, wherein: the steps of digitizing and coding the audio and video signals, deriving said ESDF data from the elementary streams, producing streams of prepackets, and appending said ESDF data as meta bytes to the prepackets are performed by hardware components; and
   the steps of merging the streams of prepackets, reading said ESDF data from the meta bytes, filling-in the ESDF data in the headers of packets and packs, and removing the meta bytes from the data stream are performed in software.

7. The method of claim 5, wherein:
   the steps of digitizing and coding the audio and video signals, deriving said ESDF data from the elementary streams, producing streams of prepackets, producing streams of prepacks, and appending said ESDF data as meta bytes to the prepacks are performed by hardware components; and
   the steps of merging the streams of prepacks, reading said ESDF data from the meta bytes, filling-in the ESDF data in the headers of packets and packs, and removing the meta bytes from the data stream are performed in software.

8. Device for processing a video signal and an audio signal, comprising:
   audio encoder means (11) for receiving an audio signal and generating an elementary audio stream (EAS);
   video encoder means (21) for receiving a video signal and generating an elementary video stream (EVS);
   audio packetiser means (12) for receiving the elementary audio stream (EAS) and generating audio prepackets (70A), each prepacket comprising a data portion (71) and a header (72);

video packetiser means (22) for receiving the elementary video stream (EVS) and generating video prepackets (70V), each prepacket comprising a data portion (71) and a header (72);

audio parser means (12) for receiving and parsing the elementary audio stream (EAS) and generating parse information;

video parser means (22) for receiving and parsing the elementary video stream (EVS) and generating parse information;

wherein the packetisers (13; 23) are designed to append the parse information to the prepackets (70A; 70V) as meta bytes (73).

9. The device of claim 8, implemented in hardware as an integrated circuit.

10. Device for processing a video signal and an audio signal, comprising:

audio encoder means (11) for receiving an audio signal and generating an elementary audio stream (EAS);

video encoder means (21) for receiving a video signal and generating an elementary video stream (EVS);

audio packetiser means (12) for receiving the elementary audio stream (EAS) and generating audio prepackets (70A), each prepacket comprising a data portion (71) and a header (72);

video packetiser means (22) for receiving the elementary video stream (EVS) and generating video prepackets (70V), each prepacket comprising a data portion (71) and a header (72);

audio prepacker means (14) for receiving the audio prepackets (70A) and generating audio prepacks (80A), each prepack comprising a data portion (81) and a header (82), each data portion (81) containing a predetermined number of audio prepackets (70A);

video prepacker means (24) for receiving the video prepackets (70V) and generating video prepacks (80V), each prepack comprising a data portion (81) and a header (82), each data portion (81) containing a predetermined number of video prepackets (70V);

audio parser means (12) for receiving and parsing the elementary audio stream (EAS) and generating parse information;

video parser means (22) for receiving and parsing the elementary video stream (EVS) and generating parse information;

wherein the prepackers (14, 24) are designed to append the parse information to the prepacks (80A; 80V) as meta bytes (73).

11. Device according to claim 10, wherein said predetermined number of prepackets in the data portion (81) of a pack (80) equals one.

12. Common meta unit (3), implemented in hardware as an integrated circuit, comprising:

packetiser means (12; 22) for receiving an elementary audio stream (EAS) and an elementary video stream (EVS), respectively, and generating audio and video prepackets (70), respectively, each prepacket comprising a data portion (71) and a header (72);

prepacker means (14; 24) for receiving the audio and video prepackets (70), respectively, and generating audio and video prepacks (80), respectively, each prepack comprising a data portion (81) and a header (82), each data portion (81) containing a predetermined number of prepackets (70);

parser means (12; 22) for receiving and parsing the elementary audio and video streams (EAS; EVS), respectively, and generating parse information;

wherein the prepackers (14, 24) are designed to append the parse information to the prepacks (80A; 80V) as meta bytes (73).

13. Packer module (60) for use in a device for processing audio and video data, comprising at least part of at least one processing device programmed to perform operations, the operations comprising:

receiving a multiplexed data stream comprising audio prepackets (70A) and video prepackets (70V) and the appended meta bytes (73);

forming packs (80), each pack comprising a header (82) and a data portion (81) containing a predetermined number of audio prepackets (70A) and/or video prepackets (70V);

reading the parse information in said meta bytes (73);

filling-in part of the parse information into data fields of the pack headers (82);

finishing the packet headers (72) by filling-in part of the parse information into open data fields of the packet headers (72); and removing the meta bytes (73) from the data stream.

14. A computer readable medium embodying software which, when running on the processor, makes such processor perform the function of a packer module, such function comprising:

receiving a multiplexed data stream comprising audio prepackets (70A) and video prepackets (70V) and the appended meta bytes (73);

forming packs (80), each pack comprising a header (82) and a data portion (81) containing a predetermined number of audio prepackets (70A) and/or video prepackets (70V);

reading the parse information in said meta bytes (73);

filling-in part of the parse information into data fields of the pack headers (82);

finishing the packet headers (72) by filling-in part of the parse information into open data fields of the packet headers (72); and removing the meta bytes (73) from the data stream.

15. Integrated multiplexer/packer module, comprising, at least part of at least one processor programmed with code, the code including:

code for receiving streams of audio prepackets and video prepackets, each with appended meta bytes, the prepackets each comprising a data portion (71) and a header (72), the meta bytes comprising parse information derived from elementary audio stream (EAS) and elementary video stream (EVS), and for combining the streams into a single stream of audio prepackets and video prepackets and the appended meta bytes;

code for receiving the single stream of audio prepackets and video prepackets and the appended meta bytes from the multiplexer module;

code for forming packs, each pack comprising a header and a data portion containing a predetermined number of audio prepackets and/or video prepackets;

code for reading the parse information in said meta bytes;

code for filling-in part of the parse information into data fields of pack headers;

code for finishing the packet headers by filling-in part of the parse information into open data fields of the packet headers; and code for removing the meta bytes from the data stream.

16. A finisher module for use in a device for processing audio and video signals, the module comprising at least part of at least one processing device programmed with code, the code comprising
- code for receiving a single stream of audio prepacks and video prepacks and appended meta bytes from a multiplexer module, each prepack comprising a data portion and a header, each data portion containing a respective predetermined number of audio or video prepackets, the metadata comprising information parsed from the audio or video data, respectively, in the prepackets;
- code for reading the parse information in said meta bytes;
- code for finishing the packet headers by filling-in part of the parse information into open data fields of the packet headers;
- code for finishing the pack headers by filling-in part of the parse information into open data fields of the pack headers; and
- code for removing the meta bytes from the data stream.

17. An integrated multiplexer/finisher module, comprising software for programming at least one processor, the software being embodied on a computer readable medium, the software comprising:
- code for receiving the streams of audio prepacks and video prepacks and the appended meta bytes;
- code for combining the streams into a single stream of audio prepacks and video prepacks and the appended meta bytes;
- code for receiving the single stream of audio prepacks and video prepacks and the appended meta bytes from a multiplexer module;
- code for reading the parse information in said meta bytes;
- code for finishing the packet headers by filling-in part of the part of the parse information into open data fields of the packet headers;
- code for finishing the pack headers by filling-in part of the parse information into open data fields of the pack headers; and
- code for removing the meta bytes from the data stream.

18. A computer readable medium embodying software which, when running on the processor, makes such processor perform the function of an integrated multiplexer/packer module, such function comprising
- receiving streams of audio prepackets and video prepackets, each with appended meta bytes, the prepackets each comprising a data portion (71) and a header (72), the meta bytes comprising parse information derived from elementary audio stream (EAS) and elementary video stream (EVS), and for combining the streams into a single stream of audio prepackets and video prepackets and the appended meta bytes;
- receiving the single stream of audio prepackets and video prepackets and the appended meta bytes from the multiplexer module;
- forming packs, each pack comprising a header and a data portion containing a predetermined number of audio prepackets and/or video prepackets;
- reading the parse information in said meta bytes;
- filling-in part of the parse information into data fields of the pack headers;
- finishing the packet headers by filling-in part of the parse information into open data fields of the packet headers; and
- removing the meta bytes from the data stream.

19. A computer readable medium embodying software which, when running on a processor, makes such processor perform the function of a finisher module, such function comprising
- receiving the streams of audio prepacks and video prepacks and the appended meta bytes;
- combining the streams into a single stream of audio prepacks and video prepacks and the appended meta bytes;
- receiving the single stream of audio prepacks and video prepacks and the appended meta bytes from a multiplexer module;
- reading the parse information in said meta bytes;
- finishing the packet headers by filling-in part of the parse information into open data fields of the packet headers;
- finishing the pack headers by filling-in part of the parse information into open data fields of the pack headers;
- removing the meta bytes from the data stream
- receiving a single stream of audio prepacks and video prepacks and appended meta bytes from a multiplexer module, each prepack comprising a data portion and a header, each data portion containing a respective predetermined number of audio or video prepackets, the metadata comprising information parsed from the audio or video data, respectively, in the prepackets;
- reading the parse information in said meta bytes;
- finishing the packet headers by filling-in part of the parse information into open data fields of the packet headers;
- finishing the pack headers by filling-in part of the parse information into open data fields of the pack headers; and
- removing the meta bytes from the data stream.

20. A computer readable medium embodying software which, when running on a processor, makes such processor perform the function of an integrated multiplexer/finisher module such function comprising
- receiving the streams of audio prepacks and video prepacks and the appended meta bytes;
- combining the streams into a single stream of audio prepacks and video prepacks and the appended meta bytes;
- receiving the single stream of audio prepacks and video prepacks and the appended meta bytes from a multiplexer module;
- reading the parse information in said meta bytes;
- finishing the packet headers by filling-in part of the parse information into open data fields of the packet headers;
- finishing the pack headers by filling-in part of the parse information into open data fields of the pack headers; and
- removing the meta bytes from the data stream.

21. Coder apparatus, comprising:
- means for digitizing and coding an audio signal to provide an elementary audio stream;
- means for digitizing and coding a video signal to provide an elementary video stream;
- means for dividing the elementary audio stream into prepackets comprising a header and a data portion;
- means for dividing the elementary video stream into prepackets comprising a header and a packet data portion;
- means for merging said packetised elementary streams into one single stream; and
- means for finishing the prepackets such as to form packets by filling-in ESDF data in at least one data field of the header of each prepacket;
- and wherein said ESDF data is derived from the elementary streams before the packetising step, and is communicated to the prepacket finishing step.

22. Digital display apparatus, comprising a coder apparatus of claim 21 for allowing such apparatus to process normal audio and video signals.

23. Digital recording apparatus, comprising a coder apparatus of claim 21 for allowing such apparatus to process normal audio and video signals.

24. Playback device, comprising a coder apparatus according to any of claims 21 for allowing such apparatus to play back normal audio and video recordings and to output digital audio and video signals.

25. Coder apparatus, comprising:
audio encoder means for receiving an audio signal and generating an elementary audio stream;
video encoder means for receiving a video signal and generating an elementary video stream;
audio packetiser means for receiving the element audio stream and generating audio prepackets, each prepacket comprising a data portion and a header;
video packetiser means for receiving the elementary video stream and generating audio prepackets, each prepacket comprising a data portion and a header;
audio parser means for receiving and parsing the elementary audio stream and generating parse information;
video parser means for receiving and parsing the elementary video stream and generating parse information;
wherein the packetisers are designed to append the parse information to the prepackets as meta bytes and the apparatus further comprises
means for creating streams of audio prepacks and video prepacks and the appended meta bytes, each prepack comprising a data portion (81) and a header (82), each data portion (81) containing a predetermined number of audio prepackets (70A) or video prepackets (70V);
at least one integrated multiplexer/finisher module implemented as program code on a medium, the code being readable by at least one data processing device and adapted to cause that device to perform operations, the code comprising:
code for combining the streams into a single stream of audio prepacks and video prepacks and the appended meta bytes;
code for reading the parse information in said meta bytes;
code for finishing the packet headers by filling-in part of the parse information into open data fields of the packet headers;
code for finishing the pack headers by filling-in part of the parse information into open data fields of the pack headers; and
code for removing the meta bytes from the data stream.

26. Coder apparatus, comprising
audio encoder means for receiving an audio signal and generating an elementary audio stream;
video encoder means for receiving a video signal and generating an elementary video stream;
audio packetiser means for receiving the elementary audio stream and generating audio prepackets, each prepacket comprising a data portion and a header;
video packetiser means for receiving the elementary video stream and generating video prepackets, each prepacket comprising a data portion and a header;
audio parser means for receiving and parsing the elementary audio stream and generating parse information;
video parser means for receiving and parsing the elementary video stream and generating parse information;
an integrated multiplexer/packer module comprising at least part of at least one data processing device programmed with code for performing operations, the code comprising:
code for combining the streams into a single stream of audio prepackets and video prepackets and the appended meta bytes;
code for receiving the single stream of audio prepackets and video prepackets and the appended meta bytes from the multiplexer module;
code for forming packs, each pack comprising a header and a data portion containing a predetermined number of audio prepackets and/or video prepackets;
code for reading the parse information in said meta bytes;
code for filling-in part of the parse information into data fields of the pack headers;
code for finishing the packet headers by filling-in part of the parse information into open data fields of the packet headers; and
code for removing the meta bytes from the data stream; and
wherein the packetisers are designed to append the parse information to the prepackets as meta bytes.

* * * * *